United States Patent
Shams et al.

(10) Patent No.: US 10,242,084 B2
(45) Date of Patent: Mar. 26, 2019

(54) LOCAL KEY-VALUE DATABASE SYNCHRONIZATION

(71) Applicant: Amazon Technologies, Inc., Seattle, WA (US)

(72) Inventors: Khawaja Salman Shams, Seattle, WA (US); Prashant Pandey, Pleasanton, CA (US); Swaminathan Sivasubramanian, Seattle, WA (US); Omer Ahmed Zaki, Bellevue, WA (US); David Craig Yanacek, Seattle, WA (US); Johanna S Olson, Issaquah, WA (US); Hendrik de Kock, Seattle, WA (US); Johnny Ying Wu, Germantown, MD (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 15/645,897

(22) Filed: Jul. 10, 2017

(65) Prior Publication Data
US 2017/0308558 A1 Oct. 26, 2017

Related U.S. Application Data

(63) Continuation of application No. 14/054,760, filed on Oct. 15, 2013, now Pat. No. 9,703,814.

(51) Int. Cl.
*G06F 17/00* (2006.01)
*G06F 17/30* (2006.01)

(52) U.S. Cl.
CPC .. *G06F 17/30578* (2013.01); *G06F 17/30569* (2013.01)

(58) Field of Classification Search
CPC ............... G06F 17/30578; G06F 17/30569
USPC .......................................... 707/638
See application file for complete search history.

(56) References Cited

U.S. PATENT DOCUMENTS

| 6,092,083 | A  | 7/2000  | Brodersen      |
|-----------|----|---------|----------------|
| 6,148,349 | A  | 11/2000 | Chow et al.    |
| 6,223,187 | B1 | 4/2001  | Boothby        |
| 6,253,257 | B1 | 6/2001  | Dundon         |
| 6,324,693 | B1 | 11/2001 | Brodersen      |
| 6,393,466 | B1 | 5/2002  | Hickman et al. |

(Continued)

OTHER PUBLICATIONS

Lakshman, Avinash, et al., "Cassandra—A Decentralized Structured Storage System," ACM SIGOPS, vol. 44, Issues 2, Apr. 2010, pp. 35-40.

(Continued)

*Primary Examiner* — Robert Stevens
(74) *Attorney, Agent, or Firm* — Robert C. Kowert; Meyertons, Hood, Kivlin, Kowert & Goetzel, P.C.

(57) ABSTRACT

A remote distributed data store may be configured to process data updates received through invocation of a common API with reference to a common schema. A local data store may also be configured to process updates through the common API with reference to the common schema. Updates to the local data store may be mapped from the local data store schema to the common schema, and applied to the distributed data store. Updates to the distributed data store may be mapped from the common schema to the local data store schema. User identity may be verified to limit data synchronization to authorized users.

20 Claims, 8 Drawing Sheets

(56) References Cited

U.S. PATENT DOCUMENTS

| | | |
|---|---|---|
| 6,438,594 B1 | 8/2002 | Bowman-Amuah |
| 6,496,833 B1 | 12/2002 | Goldberg et al. |
| 6,523,036 B1 | 2/2003 | Hickman et al. |
| 6,571,232 B1 | 5/2003 | Goldberg et al. |
| 6,704,747 B1* | 3/2004 | Fong ............... G06F 17/30893 |
| 6,711,579 B2 | 3/2004 | Balakrishnan |
| 6,799,190 B1 | 9/2004 | Boothby |
| 7,139,768 B1 | 11/2006 | Janzig et al. |
| 8,185,497 B2 | 5/2012 | Vermeulen |
| 2003/0110176 A1* | 6/2003 | Morgan ............ G06F 17/30569 |
| 2004/0006564 A1 | 1/2004 | Lucovsky et al. |
| 2004/0210552 A1 | 10/2004 | Friedman et al. |
| 2005/0086188 A1 | 4/2005 | Hillis |
| 2005/0251503 A1 | 11/2005 | McCauley |
| 2005/0256834 A1 | 11/2005 | Millington |
| 2007/0299881 A1 | 12/2007 | Bouganim |
| 2008/0201234 A1 | 8/2008 | Castro et al. |
| 2008/0201338 A1 | 8/2008 | Castro |
| 2008/0275907 A1* | 11/2008 | Han .................... G06F 17/2247 |
| 2009/0024590 A1 | 1/2009 | Sturge et al. |
| 2010/0010960 A1 | 1/2010 | Singh |
| 2010/0241629 A1 | 9/2010 | Tatemura et al. |
| 2011/0191361 A1 | 8/2011 | Gupta et al. |
| 2012/0072465 A1 | 3/2012 | McGowan et al. |
| 2012/0072541 A1 | 3/2012 | Carls et al. |
| 2012/0265744 A1 | 10/2012 | Berkowitz |
| 2013/0103729 A1 | 4/2013 | Cooney et al. |
| 2014/0067781 A1 | 3/2014 | Wolchok et al. |
| 2014/0279893 A1 | 9/2014 | Branton |
| 2015/0106407 A1 | 4/2015 | Adayilamuriyil et al. |

OTHER PUBLICATIONS

Pady, Rabi Prasad, et al. "RDBMS to NoSQL: Reviewing Some Next-Generation Non-Relational Database's," IJAEST, vol. 11, Issue 1, pp. 15-30.

Hertel, Alice, et al. "RDF Storage and Retrieval Systems," Handbook on Ontologies, International Handbooks on Information Systems, Springer-Verlag, Berlin, German, (c) 2009. pp. 489-508.

Ghandra, Deka Ganesh, et al., "A Study on Cloud Database," CICN 2012, Mathura, Uttar Pradesh, India, Nov. 3-5, 2012 (c) IEEE Computer Society, pp. 512-519.

Garrote, Antonio, et al., "RESTful writable APIs for the web linked data using relational storage solutions," LDOW 2011, Hyderabad, India, Mar. 29-Apr. 1, 2011, pp. 1-9.

Lanthaler, Markus, et al., "On Using JSON-LD to Create Evolvable RESTful Service," WS-REST '12, Lyon, France, Apr. 16, 2012, pp. 25-32.

Baru, Chaitany, et al., "The SDSC Storage Resource Broker," CASCON'98, Toronto, Canada, Nov. 30-Dec. 3., 1998, Article 5, pp. 1-12.

Auradkar, Aditya, et al., "Data Infrastructure at LinkedIn," ICDE 2012, Washington, DC, Apr. 1-5, 2012, pp. 1370-1381.

Chihoub et al.; "Harmony: Towards Automated Self-Adaptive Consistency in Cloud Storage"; IEEE Computer Society; CLUSTER 2012; Sep. 2012; p. 293-301.

DeCandia et al.; "Dynamo: Amazon's Highly Available Key-value Store"; SOSP 2007; Oct. 2007; p. 205-220.

Dutta et al.; "Chapter 16: Distributed Storage of Large-Scale Multidimensional Electroencephalogram Data using Hadoop and HBASE"; Grid and Cloud Database Management; 2011; p. 331-347.

Gueret et al.; "Assessing Linked Data Mappings Using Network Measures"; ESWC 2012; May 2012; p. 87-102.

Hogqvist et al.; "Towards Explicit Data Placement in Scalable Key/Value Stores"; Fourth IEEE Int'l Conference of Self-Adaptive and Self-Organizing Systems Workshop—SASOW 2010; Sep. 2010; p. 229-233.

Ibrahim et al.; "LEEN: Locality/Fairness—Aware Key Partitioning for MapReduce in the Cloud"; 2nd IEEE Int'l Conf. on Cloud Computing Technology and Science—CloudCom 2010; Nov.-Dec. 2010; p. 17-24.

Thomson et al.; "Calvin: Fast Distributed Transactions for Partitioned Database Systems"; SIGMOD 2012; May 2012; p. 1-12.

Wang et al.; "A Highly-Scalable Key-value Storage System for Latency Sensitive Applications"; Int'l Conf. on Complex, Intelligent and Software Intensive Systems—CISIS 2009; Mar. 2009; p. 537-542.

Yanggratoke; "The Amazon Web Services"; TKK T-110.5190; Seminar on Internetworking; 2009; p. 1-7.

Zhong et al.; "A Novel Method to Manage Very Large Raster Data on Distributed Key-Value Storage System"; GeoInformatics 2011; Jun. 2011; p. 1-6.

"Data dictionary", Wikipedia, downloaded from en.wikipedia.org/wiki/Data_dictionary on Sep. 17, 2016, pp. 1-4.

Han, Jiawei, et al., Data Mining: Concepts and Techniques, Morgan Kaufmann Publishers, Academic Press—A Harcourt Science and Technology Company, San Diego, CA, © 2001, pp. 148-154, 179-208 and 244-246.

Sheldon, Robert, et al., Beginning MySQL, Wiley Publishing, Inc., Indianapolis, IN, © 2005, pp. 109-137.

Microsoft Computer Dictionary, 4th Edition, Microsoft Press, Redmond, WA, © 1999, pp. 146 and 333.

"Database schema", Wikipedia, downloaded from en.wikipedia.org/wiki/Database_schema on Sep. 17, 2016, pp. 1-4.

* cited by examiner

LOCAL KEY-VALUE DATABASE SYNCHRONIZATION

This application is a continuation of U.S. patent application Ser. No. 14/054,760, filed Oct. 15, 2013, now U.S. Pat. No. 9,703,814, which is hereby incorporated by reference herein in its entirety.

BACKGROUND

A service provider may maintain a remote distributed data store on behalf of its customers. This may involve operating a distributed database management system that employs techniques such as horizontal partitioning and replication, or other methods of scaling the system to meet customer demand. Application of these techniques may cause the distributed data store to behave differently than an otherwise comparable local, non-distributed data store. This may be the case even when a distributed data store and a local data store utilize the same data model. For example, a distributed data store and a local data store might each utilize a key-value data model, but nevertheless behave in a different manner due to partitioning, replication, and other factors. These differences may interfere with utilizing a local database in conjunction with a remote distributed data store.

BRIEF DESCRIPTION OF DRAWINGS

The drawings provided herein are designed to illustrate example embodiments and are not intended to limit the scope of the disclosure.

DETAILED DESCRIPTION

Figure 1:
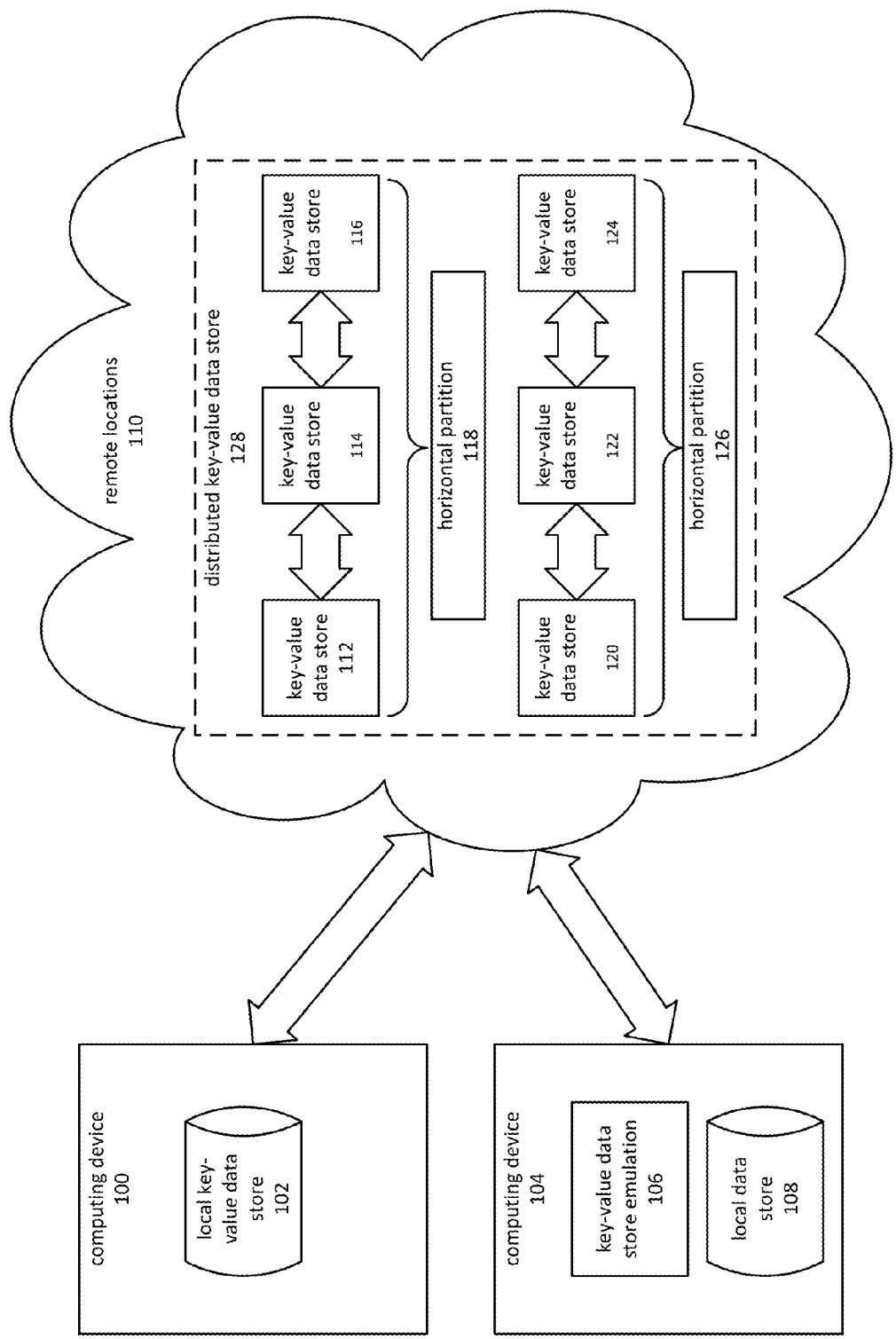
FIG. 1 is a block diagram depicting an embodiment of a system comprising one or more computing devices with local data stores synchronizing with a remote distributed data store.

Distributed data stores may exhibit different characteristics than local data stores. In order to provide data store and retrieval services to a potentially large number of users, a provider of a hosted data service may employ distributed computing techniques not commonly applied to on-premises data stores, which may be referred to as local data stores. In some cases, providers of a hosted data service may utilize different data models than those commonly used with local data stores. For example, a provider may utilize a key-value paradigm rather than the relational model. Application of these and other techniques may result in a distributed data store that behaves differently than a local, non-distributed data store.

These and other differences may interfere with scenarios that involve testing applications against a local data store prior to deployment, or utilizing a common code base against a local or a remote data store. In addition, in some cases there may be a need to synchronize between a local data store and a remote distributed data store.

A provider may host a data store in a datacenter and provide access to the data store as a service to various entities, typically clients of the provider. The data store may be exposed to clients through a web service, a web application, a remote procedure call and so forth. These mechanisms and others may be referred to herein as services. In some embodiments, a data store may provide an integrated front-end that exposes one or more of the services to end users of the entities or customers. Through the services, the end users may make requests that include various operations and queries to be performed on the data store through the use of application programming interface ("API") calls to the service. A request may comprise, for example, an invocation of an API on behalf of a client, as well as an invocation of an operation on a data store on behalf of a client. An invocation of an API may be based on a schema, which may generally be described as a definition of the structure or organization of data maintained in a data store. An API may be described as a standard for interacting with the service. An invocation of an API may be described as asking some implementation of the API to perform the requested function.

The provider of a remote data store service may also require payment from a client in exchange for the use of the capacity. However, the profitability of the endeavor may depend on a customer paying an amount that is proportional to the capacity consumed on its behalf. A limit on capacity consumption may be imposed on a client and enforced through various techniques such as throttling, queuing, and so forth. When usage exceeds the amount provisioned to the customer, requests for services on behalf of a customer may be rejected or suspended.

Providers of these services may employ a distributed data store. A distributed data store may maintain data organized by collections of items. The items may each comprise a set of name value pairs, a set of values identified by column names or undefined values. For convenience, collections of items may be referred to as tables. In various embodiments, individual items in a collection may not conform to any particular schema, and each item may accordingly contain a different number of values—each of which may have a different logical meaning and type. Values that have the same logical meaning and type, such as those identified by the same name or column, may for convenience be referred to as columns. Other embodiments of a data store may enforce particular structural requirements, such as row and column format, uniqueness constraints, primary and foreign key relationships and the like. Examples of distributed data stores include key-value databases, relational databases, non-structured query language ("NoSQL") databases, document-oriented databases, object-oriented databases and so forth.

The items in a collection may be identified by primary key values. Each primary key value, taken as a whole, uniquely identifies an item stored in the collection. To access an item, a client of the distributed data store may issue a request that includes a primary key value that corresponds to that item. Embodiments may also support access using secondary keys, which may not necessarily correspond to precisely one item in a table.

Primary keys may be defined when the collection is created. A description of a primary key may be stored with other aspects of the collection's schema, which may include any required columns, constraints on values and so forth. For the primary key, schema may include a description of the length and value of a primary key. For example, a primary key might be defined as a 256-bit binary value or as a variable-length string of characters.

Primary keys may also be used in a distributed data store in conjunction with partitioning. In order to support large volumes of data and high workload demands, distributed data stores may support partitioning the data in a table over a number of computing nodes. Various forms of partitioning may be supported. In horizontal partitioning, each computing node may maintain a subset of the collection of items. In vertical partitioning, data may be divided based on columns or fields, so that each computing node may contain a subset of the columns defined on the table. Distributed data stores may host each horizontal or vertical partition on a separate computing node.

While a table can be split into multiple horizontal partitions, each horizontal partition may be replicated between computing nodes so that the same item is stored on more than one computing node, or more generally the same horizontal partition may be hosted on more than one computing node. This may improve the availability of the system, because if one of the computing nodes becomes unavailable another computing node having the replicated data may be able to step in and take its place. Replication may improve the scalability of the system by allowing load to be shared among multiple computing nodes Consistency between replicated partitions may be maintained using a technique that involves quorum or consensus between the replicated partitions. Embodiments may require quorum only among currently active computing nodes, which may improve availability because it does not require all of the computing nodes to be online.

In some embodiments, quorum may involve determining that a minimum number of computing nodes participate in a read or write operation. For read operations, at least the minimum number of computing nodes must respond to a request to read an item. Because data is not necessarily replicated immediately, it may be the case that two given computing nodes will have different values for the same item. If so, some embodiments may return each version of the data, along with information descriptive of the version. For write operations, quorum may involve the minimum number of computing nodes acknowledging the success of a write operation. For example, if three computing nodes share replicated data, a write operation might be required of two of the three computing nodes. Embodiments may impose different quorum requirements based on the type of operation involved. For example, write operations may involve a higher threshold number of computing nodes in order to achieve quorum.

A distributed data store may support a wide variety of operations. Non-limiting examples include put operations, which involve storing or updating items, and read operations, which involve retrieving values corresponding to an item. Both operations may supply primary key values for use by the distributed data store in identifying the item. Another example of an operation that may be supported by some embodiments is a range query. A range query involves returning a span of items conforming to some set of fixed criteria. The various operations on data may be made more efficient through the use of index structures, which may be over the primary key. In addition to a primary key-based index, a secondary index may be used. Unlike primary key values, secondary key values are not necessarily unique. In other words, a single secondary key value may refer to one or more entries in a secondary index.

Distributed data stores may reflect a data consistency pattern that can be described as eventual consistency. This term refers to updated data that is not immediately available, in updated form, even after an update has been committed. For example, an update might be committed in a distributed data store with three replication partners. An update might be committed and also stored in two of the three replication partners, but not a third. If a query were to rely on the third replication partner, the results would reflect a previous version of the data, rather than the currently committed version of the data. However, because the update has been committed, the update will eventually be applied to the third replication partner. Accordingly, the data may be said to be eventually consistent. A similar pattern may be seen with index structures. Some indexes may not be immediately updated to reflect an update to a data store. If so, results of a query that relies on that index may correspond to a version of the data prior to the update. However, eventually the index will be updated and will return consistent results.

In contrast to a distributed data store, a local data store may not exhibit the various behaviors described above in regards to distributed data stores. For example, a local data store may typically operate only on a single computing node without any replication partners, and therefore not exhibit eventual consistency behaviors related to replication. In addition, because a local data store is not hosted by a provider, a local data store is not typically subjected to limits on capacity utilization. These and other differences in behavior may make testing applications against a local data store less effective than testing applications against a distributed data store. In various embodiments, a local data store may be located on the same device as one or more applications that utilize the data store. In other embodiments, a local data store may be accessible through a network connected to a computing device on which one or more applications operate. In some embodiments, a local data store is one operated or administered by a client of a hosting provider, and a remote data store is one operated and administered primarily be a hosting provider.

Another issue involving the use of local data stores is transferring and synchronizing data. Various scenarios include generating an initial data set on a local data store during testing, and transferring the data set to a distributed data store when an associated application is deployed. Another scenario includes a common code base operating on a local device, against a local data store, when there is no network connectivity with a remote distributed data store. When network connectivity is restored, data maintained in the local and remote data stores may be synchronized.

In various cases and embodiments, local data stores may employ different data models than the remote data store. Various non-limiting examples include relational databases, document-oriented databases, JAVASCRIPT object notation ("JSON") stores, XML databases, object-oriented databases, in-memory data structures and so forth. Embodiments may therefore map between items in a remote distributed data store and items in the local data store. This may involve identifying item values in an item collection and mapping to entities in the local data store schema, such as columns, object fields and so forth. Similar mappings may be performed when the local and remote data stores employ the same data model. In other cases, the data model and schemas employed may be the same, or sufficiently similar, so that mapping can be performed on a one-to-one basis, or directly.

FIG. 1 depicts a system comprising multiple computing devices, such as computing device 100 and computing device 104, having local data stores that are synchronized with a remote data store. A computing device may be any number of devices comprising a processor and a memory. Non-limiting examples include personal computers, mobile phones, tablets, embedded systems and so forth. In some embodiments, a physical computing device may host a virtual computing environment within which aspects of the present disclosure are practiced. The term local, as used herein, refers to data or operations associated with a computing device that is, for example, remote to off-premises computing resources. For example, operations performed on a smartphone could be considered local, while operations offloaded to a data center through a web service could be considered remote. Similarly, data stored on the smartphone could be considered local while data stored at the data center could be considered remote.

Various processes operating on a computing device, such as computing device 100 or computing device 104, may store information on a local data store using APIs that support key-value data stores. The term API may comprise any of various methods of interacting with a key-value database, such as functions, methods, remote-procedure calls, protocols and so forth. Key-value data stores may be described as having key-value semantics, which includes APIs compatible with the use of a key-value store, as well as various behaviors consistent with the use of a key-value data store. For example, support for key-value semantics may involve providing APIs and behavior allowing a set of values to be associated with a key.

Embodiments may provide support for the use of key-value semantics using a variety of approaches. One example is depicted by local key-value data store 102, which may natively implement a key-value database. In other words, local key-value data store 102 may be designed and implemented primarily as a key-value store, as opposed to a relational database or some other form of data store.

In other embodiments, a local data store may comprise a relational database, object-oriented database, in-memory or on-disk data structure and so forth. For example, local data store 108 could be implemented as a relational database, or as a NoSQL database that has different key-value semantics than is desired. Embodiments may employ a component such as key-value data store emulation 106 to allow processes operating on computing device 104 to access data using the desired key-value semantics. Emulation of key-value semantics may comprise mapping between schemas, translating query statements, converting data types, and adapting to API differences.

Data may be exchanged between a local data store, such as local data stores 102 and 108, and a distributed key-value data store 128 hosted at one or more remote locations 110. Exchange of data between local data stores, such as local data stores 102 and 108, and a remote distributed key-value data store 128 may comprise various operations such as bulk import, bulk export, replication and synchronization. Bulk imports and exports involve transmission of blocks of data from a local data store to a distributed data store, or from a distributed data store to a local data store. Replication may involve data transfers from one data store to another, so that all or part of the source data store may be mirrored on the target data store. Synchronization involves mirroring, and also involves ensuring that updates made to one data store are propagated or at least reconciled with other data stores.

Distributed key-value data store 128, may comprise a plurality of horizontal partitions, such as horizontal partitions 118 and 126. Each horizontal partition may be replicated. For example, horizontal partition 118 might comprise three key-value data stores 112, 114, and 116 which generally contain the same set of replicated data. One of these, say key-value data store 114, might be considered a master copy which initially receives updates and propagates changes to its replication partners, in this case key-value data stores 112 and 116. A quorum system may be employed for the purposes of committing changes and/or maintaining serializability. A second horizontal partition 126 may comprise key-value data stores 120, 122 and 124, and may replicate data in a manner similar to horizontal partition 118. Each replication partner may be hosted at the same location or a different location. There may, accordingly, be a variable amount of lag or delay in propagating updates to all of the replication partners. In addition, the use of quorum and other techniques related to using distributed computing techniques may introduce variations in the behavior of a distributed key-value data store as compared to a local key-value data store.

Figure 2:
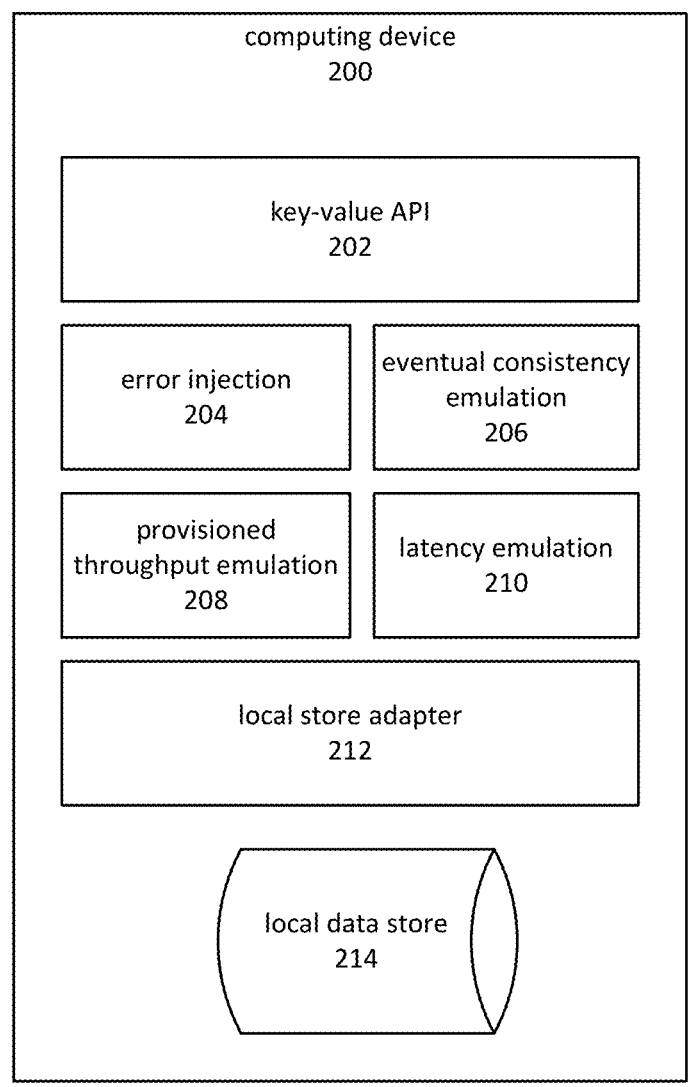
FIG. 2 is a block diagram depicting an embodiment of a system for emulating behaviors of a distributed data store on a computing device with a local data store.

FIG. 2 depicts an embodiment of a system for emulating the behavior of a distributed key-value data store using a local data store 214 operating on computing device 200. A key-value API 202 may provide access to local data store 214 using key-value semantics. When local data store 214 is itself a key-value data store, key-value API 202 may comprise a lightweight wrapper or other code module serving as a front-end to data store 214. If local data store 214 comprises another type of database system, such as a relational database or a proprietary data structure, key-value API 202 may perform additional translation and emulation operations, alone or in conjunction with other components such as local store adapter 212. Note that embodiments may perform two aspects of emulating a distributed key-value data store. The first involves emulating the semantics of a key-value data store, while the second involves emulating behavior related to distributed systems.

Applications operating on computing device 200 may access data using key-value API 202, independently of the semantics of the underlying local data store 214. Embodiments may configure key-value API 202 to be compatible not only with applications running on a local device, such as computing device 200, but also on a remote device, such as an application running in an off-premises data center and connected to a distributed key-value store. For example, an application might be written and tested on a local device using a local data store, and then deployed to a data center. At the same time, data from the local data store might also be exported to a distributed key-value data store. The application would then be able to commence operation at the data center using the data originally kept locally.

In order to allow such an application to be tested before deployment, embodiments may provide various emulation capabilities. A wide variety of behaviors might be emulated, including and in addition to those depicted in FIG. 2. Embodiments may perform emulation to allow for a single code base to be used on local devices and off-premises computing facilities, to avoid vendor lock-in, to improve testing procedures and so on. Embodiments may detect various characteristics of the environment in which the code runs to determine whether the applicable data store is a local data store or a distributed data store.

FIG. 2 depicts a number of modules that may provide emulation capabilities in various embodiments. A module may be considered to be some combination of computer-executable instructions and/or circuitry that, when executed by a processor, performs the indicated functions. Those of ordinary skill in the art will appreciate that the depicted modules are illustrative of potential embodiments and should not be construed as limiting the scope of the present disclosure. At least some of the depicted modules could be omitted, merged into other modules, or combined with other executable code and/or circuitry.

Error injection 204 comprises a module that introduces simulated errors in a controllable fashion, to simulate testing. Embodiments may, for example, randomly inject errors that might normally occur only in a distributed key-value store. This includes errors related to replication, quorum, authentication, throttling, provisioned throughput and so on. Embodiments might also simulate node failover events that may occur when a replicated data store, or the computing node on which it operates, experiences an error that causes it to cease functioning.

Distributed databases may have behaviors related to eventual consistency. Embodiments may therefore emulate this behavior, as depicted by module 206. In one embodiment, read requests are modified to sometimes return pre-modification values in order to simulate an effect of eventual consistency. In a distributed data store, an update applied to one node might take some time to propagate from one data store to another data store acting as a replication partner. In addition, there may be a delay in updating data structures such as indexes. Accordingly, returning a pre-modification value may simulate an effect of using a replication partner as the source of the data. The pattern of returning old and new values may be based partly on a simulated pattern of accessing replication partners for workload distribution, such as with a round robin scheme. For example, in a three-node replication scheme the emulation could return a new value 33.3% of the time and an old value 66.6% percent of the time. To simulate the effect of delayed index updates, queries may return results that would be accurate under the old data, but inaccurate after considering the effect of the new data.

In order to support returning old (i.e. pre-update) values or to simulate the behavior of old indexes, embodiments may, for example, extend the schema of the local data store or utilize a new data store in order to retain pre-update values.

Provisioned throughput emulation 208 may comprise maintaining counts or metrics pertaining to use of the data store. A hosted remote distributed data store may impose a fee structure based upon an amount of data transferred to or from the data store. In various embodiments, this may be a fixed total amount, an amount per unit time and so on. When the amount of data transferred exceeds a limit, throttling may result. This may imply a delay in processing operations, extra charges accrued, or a throttling error. Emulation of provisioned throughput restrictions may allow testing and predictions related to provisioned throughput issues. The cost of hosting a service, for example, might be estimated using a local data store prior to deployment to a remote distributed data store. Embodiments might also provide recommendations as to the level of throughput that should be provisioned. This may, for example, be based on running tests against a local data store to estimate an amount of provisioned throughput that may be needed at the remote distributed data store.

Latency emulation 210 refers to simulating the effects of latency that might be encountered while running against a distributed system. Embodiments may delay sending responses by an appropriate amount of time. The amount of delay may depend on various factors. These may include delays based on the geographic distribution of data centers hosting replicated data stores. For example, referring to FIG. 1, key-value data store 112 and key-value data store 114 might be located in separate data centers located on different continents. Depending on where the data centers are located, varying amounts of delay are to be expected. In addition to or instead of geography, network topology may be used. This may include, for example, the number of hops required to communicate between a computing device and a key-value data store.

Query latency may also be emulated. This may be based partly on horizontal partitioning of data. For example, in FIG. 1 data in a collection might be divided between horizontal partitions 118 and 126. Querying and assembling result sets may take longer when data is hosted on multiple partitions, as compared to when data is hosted within a single partition. Embodiments may therefore simulate additional latency when satisfying a query would, if performed on a distributed key-value data store, cross horizontal partition boundaries.

Local store adapter 212 may provide adaptations for simulating the semantics of a key-value store, when local data store 214 does not provide native support. Embodiments may utilize a variety of approaches to simulate key-value semantics. For example, if local data store 214 is a relational database, the following techniques might be employed, alone or in some combination. Indexes corresponding to the key in a key-value collection may be created, if not already present, to provide more efficient access to values based on the key. A view may be created in which two or more tables are joined based on the key. The same join may be issued on an ad hoc basis, rather than creating a view. Statements issued to the key-value API may be translated from (for example) PUT and GET statements to INSERT and SELECT statements. When forming statements, projections may be based on values associated with a key.

Figure 3:
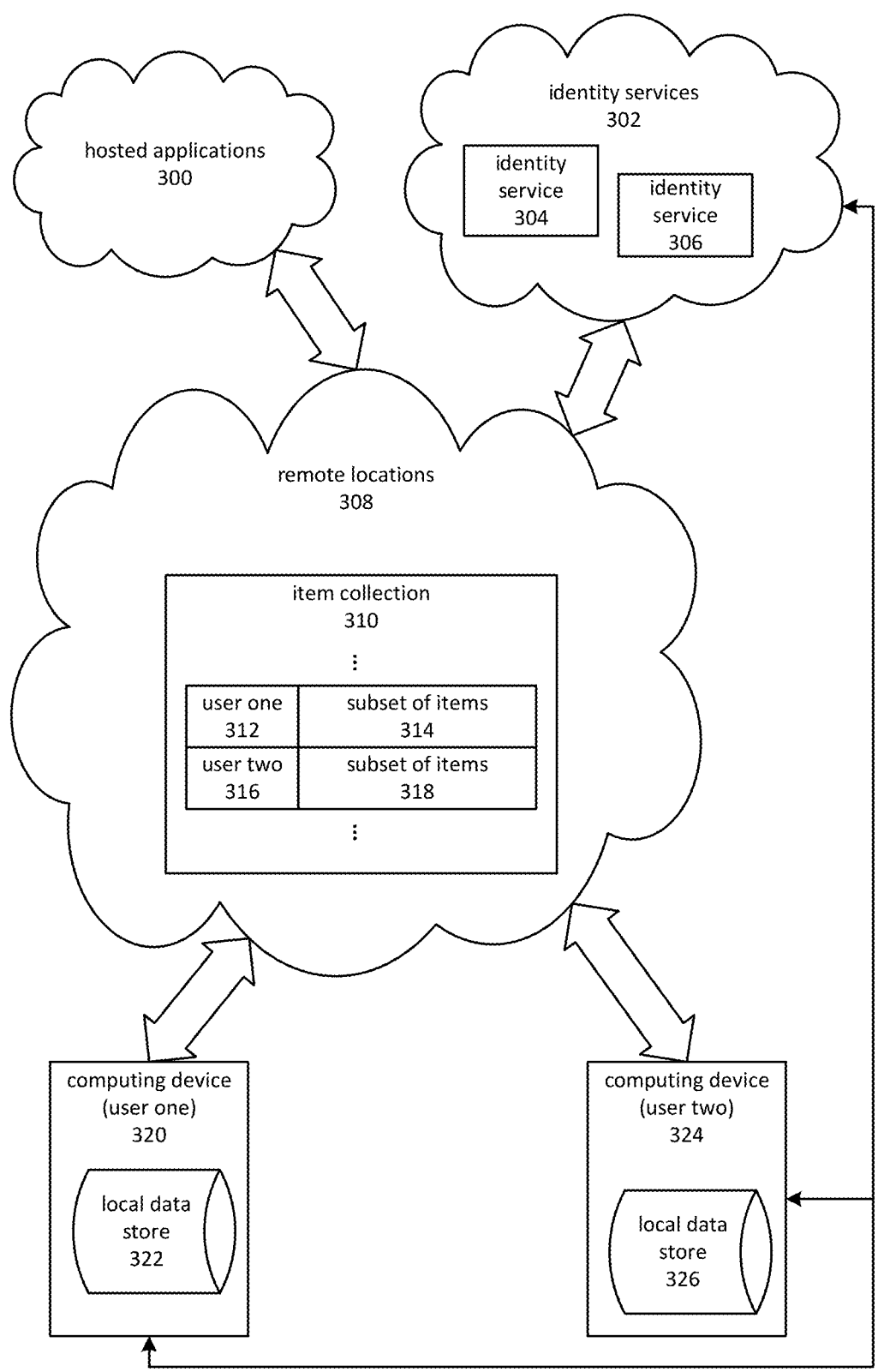
FIG. 3 is a block diagram depicting an embodiment of a system comprising multiple devices and applications writing data to local and distributed data stores.

In some embodiments, a number of local key-value stores, each operating on a computing device, may be synchronized with a central remote key-value data store. Moreover, data from each device may be stored within a single collection maintained by the remote key-value data store. FIG. 3 depicts an embodiment of a system which synchronizes data between multiple computing devices and a single item collection hosted by a distributed key-value store.

In FIG. 3, item collection 310 may be a collection of items accessible and storable by a key value. For illustrative purposes, item collection 310 may contain a subset of items 314 associated with user one 312 and a subset of items 318 associated with user two 316. In this context, the term item may refer to keys and their associated values. For security reasons, subset of items 314 should be accessible to user one 312 but not to user two 316, and subset of items 318 should be accessible to user two 316 but not user one 312. Embodiments may impose these restrictions when transferring data to or from item collection 310. For example, if computing device 320 is operated by user one, then data added to local key-value store 322 should not be allowed to affect any data contained in subset of items 318 during synchronization. Similarly, if computing device 324 is operated by user two, changes to subset of items 318 should, for security reasons, be propagated to local data store 326 but not local data store 322.

Various hosted applications 300 may also add data to item collection 310. Some of this data may be associated with a particular user, such as user one 312, and thereafter embodiments may prevent such data from being accessible to users other than user one 312. Other data may be common to all users. Embodiments may therefore make common data accessible to all users.

Embodiments may utilize federated identity services to verify the identity of users and control access to data in a common item collection. Federated identity refers to linking a user's identity across multiple independent domains. To do so, one or more public identity services 302, such as identity service 304 and identity service 306, may be utilized. The identity services 302 may be available through a public network such as the Internet. These services allow for a user to be authenticated with a single sign-on and for exchange of associated credentials across multiple security domains, such as those that might exist between computing device 320 and remote locations 308. A user of computing device 320 might perform authentication through an identity service 304 (for example) prior to communication with the remote distributed data store. The remote distributed data store, upon receiving a verified identity of the user originating from identity service 304, may authenticate the user even when the remote distributed data store has no preexisting knowledge of that user's identity. The remote distributed data store may maintain an association between the verified identity and items owned by the corresponding user within a consolidated collection containing items owned by multiple users.

Figure 4:
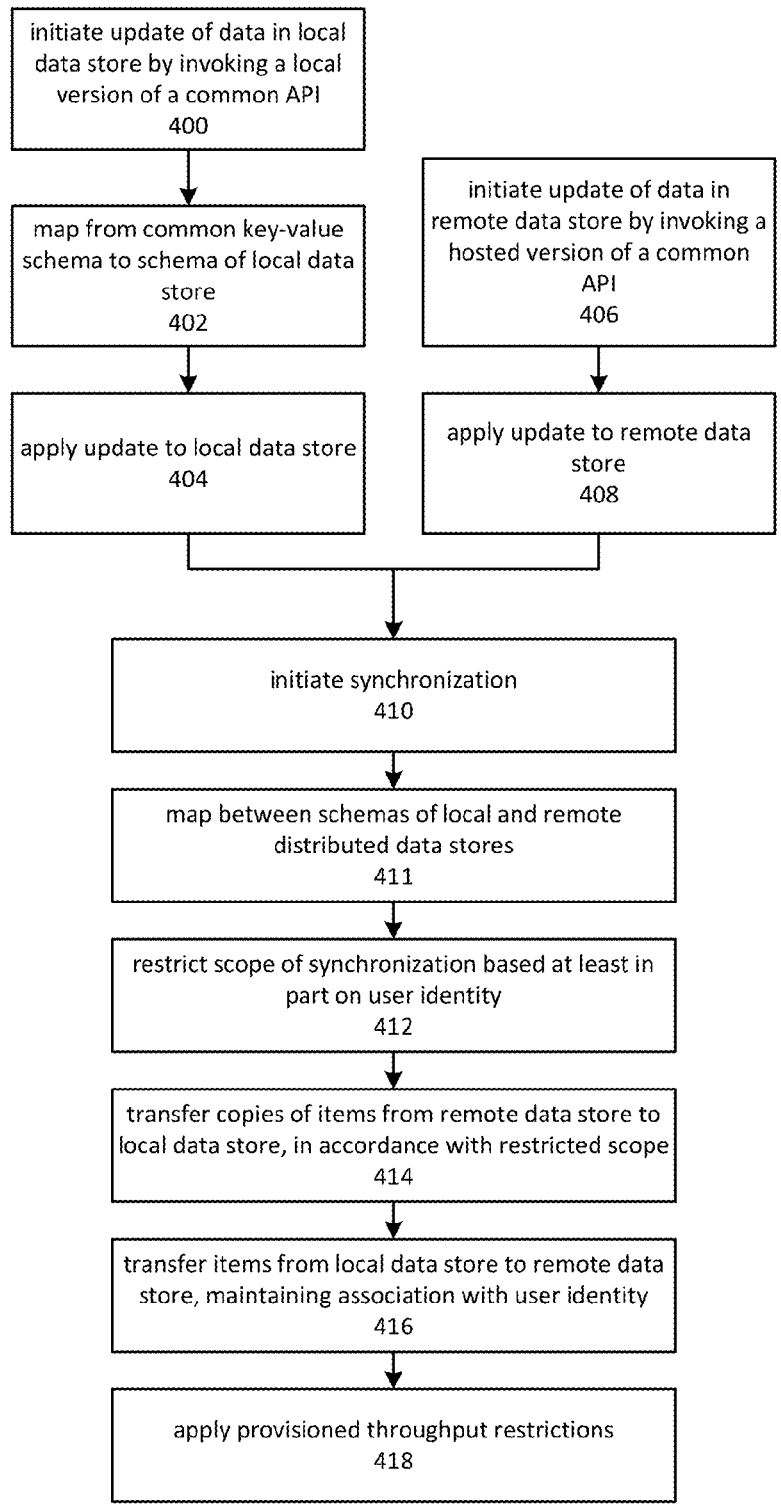
FIG. 4 is a flowchart depicting an embodiment of a process for synchronizing data between a local data store and a remote data store.

FIG. 4 depicts an embodiment of a process for synchronizing data between a local data store and a remote data store. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operations 400, 402, and 404 depict applying an update to a local data store. These operations may be performed on a local device while operations 406 and 408, which relate to updating data in a remote data store, are processed. Accordingly, when synchronization is initiated at operation 410, there may be new, altered, or deleted data on the local data store as well as the remote data store.

Operation 400 depicts initiating an update of a local data store by invoking a local version of a common API. The term "common API" refers to an API that may be employed on a local device in conjunction with a local data store, or in a hosted environment against a remote data store. Note that the term "common API" does not necessarily imply that instructions and/or circuitry implementing common APIs are the same. However, methods of interaction are the same between different versions of a common API.

Operation 402 depicts mapping from a common key-value schema to a schema employed by a local data store. Interactions with a common API may be partially expressed by reference to a common schema. Embodiments may therefore support inserting, updating, and deleting data on a local device or in a hosted environment through commands that refer to data using the same key-value oriented schema. However, the local data store may not necessarily be a key-value data store. In some embodiments, the local data store may be a key-value data store but utilize a different schema. In either case, a translation step may be performed in which references to the common schema are translated to references to the local schema. This operation may include transformations of commands such as key-value commands such as PUTS and GETS to relational commands such as INSERT or SELECT. It may also include mapping from an item collection referenced by a common schema to one or more tables in a relational database. Embodiments may employ joins, projections and so forth to cause INSERT or SELECT commands to apply to a set of values corresponding to those in the collection. Embodiments may also employ various techniques such as multi-valued columns or sparse column support. These techniques may be employed, by various embodiments, in conjunction with mapping variable numbers of values in a key-value schema to a generally fixed number of columns in the relational model.

In some embodiments, operations 400 and 402 may be omitted or altered to the extent that the local data store is accessed independently of a common API or common schema. Data may be downloaded from the remote distributed data store to the local data store, or uploaded from the local data store to the remote distributed data store. The upload or download may be performed in conjunction with mapping between the schemas of the local and remote data stores. In some embodiments, a parallel data store may also be operated locally. The parallel data store may more closely reflect the schema of the remote distributed data store than the primary local data store. Replication and schema mapping may be performed locally.

Operation 404 depicts applying the update to a local data store. This may comprise executing commands formulated by the mappings described above regarding operation 402. By applying the update, the local data store may contain new or modified data, or data may have been deleted. During the synchronization process initiated at operation 410, these changes may be propagated to and/or reconciled with the remote data store.

The remote data store may also have updated data. Operation 406 depicts initiating an update of the remote data store by invoking a hosted version of the common API. This may occur, for example, when a hosted application invokes a version of the common API. A hosted application may comprise various forms of code or instructions that are executed on computing facilities remote to the local device, such as those provided by a remote data center. In some cases and embodiments, an update may be initiated through a web service, remote procedure call and so forth.

At operation 408, the update may be applied to the remote data store. In various embodiments, the remote data store comprises a distributed key-value database. When the common API is based on a key-value paradigm, little or no translation is required. However, in some cases the common API may utilize different schema or semantics than those used by the remote data store. In such cases, embodiments may map between the schema or semantics of the common API and those of the remote data store.

Operation 410 depicts initiating the synchronization process. In general terms, synchronizing may involve applying changes made to the local store to the remote store, and applying changes made to the remote store to the local store. A reconciliation process may be employed to resolve conflicting changes. Data may be exchanged using a variety of approaches including log-based methods or a mark-and-sweep approach. In the log-based method, entries describing incremental changes to data are exchanged. In the mark and sweep approach, changed items are marked accordingly and sent in full during reconciliation. Embodiments may employ various other approaches and optimizations.

Operation 411 depicts mapping between schemas of the local and remote distributed data store. Embodiments may map from the schema of the remote distributed data store to that of the local data store, or from the schema of the local data store to the schema of the remote distributed data store. As used herein, the term mapping may apply to mappings in either direction. Embodiments may, for example, perform a bulk transfer of data from a remote distributed data store to a local data store. The data may be mapped to the schema of the local data store and stored locally. Embodiments may also perform bulk uploads from the local data store to the remote distributed data store, in which case the data may be mapped from the schema of the local data store to the schema of the remote distributed data store.

Operation 412 depicts restricting the scope of the synchronization based at least in part on user identity. As described herein, user identity may be verified through the use of public federated identity services, or various other approaches. Data from multiple users may be stored within the same collection at the remote store. Embodiments may restrict the synchronization process to apply only to those items in the remote data store that are associated with the user.

Operation 414 depicts transferring data from a remote data store to a local data store. As indicated above, the scope of the transfer may be limited based on user identity. If so, embodiments may limit the transfer to include only those items that are owned by the user, or for which the user has read privileges. Data transferred to the local device may be applied to the local store, possibly subject to a reconciliation process if there are conflicting updates.

Operation 416 depicts transferring data from the local data store to the remote data store. The data may then be applied to the remote data store, restricted by the scope of the operation as determined based on user identity. Embodiments may prevent updates from being applied to data that is not owned by a user, or items for which the user does not have write privileges. When data is inserted, an association between the user and the data may be maintained in the remote data store, to indicate that the user has access rights to the data.

Operation 418 depicts applying provisioned throughput restrictions to the synchronization process. For example, some embodiments may restrict throughput on the remote data store to a provisioned amount. This may be based, for example, on a level of service purchased by the user. These limits may be exceeded during synchronization. Embodiments may employ a number of approaches in regards to provisioned throughput restrictions. In one embodiment, the amount of data requiring transfer is determined and used to break the synchronization process into segments that are small enough to have a low likelihood of encountering a provisioned throughput restriction. In another embodiment, synchronization is paused should a provisioned throughput restriction be encountered. In yet another embodiment, synchronization is performed continuously or in frequent increments, so that each phase is unlikely to trigger a throughput restriction.

Embodiments may perform one-directional transfers of data. For example, embodiments may perform a bulk upload of data from a local data store to a remote data store, or from a remote data store to a local data store. Embodiments may request and receive information from the remote data store or other source that is indicative of provisioned throughput restrictions. The information may indicate the rate of throughput allowed, a burst rate allowed, usage pattern information, and so forth. Based on the information, embodiments may schedule bulk transfers to minimize the possibility of provisioned throughput being exceeded. Embodiments may also apply throttling to restrict transfers to using a specific amount of throughput per unit of time.

Figure 5:
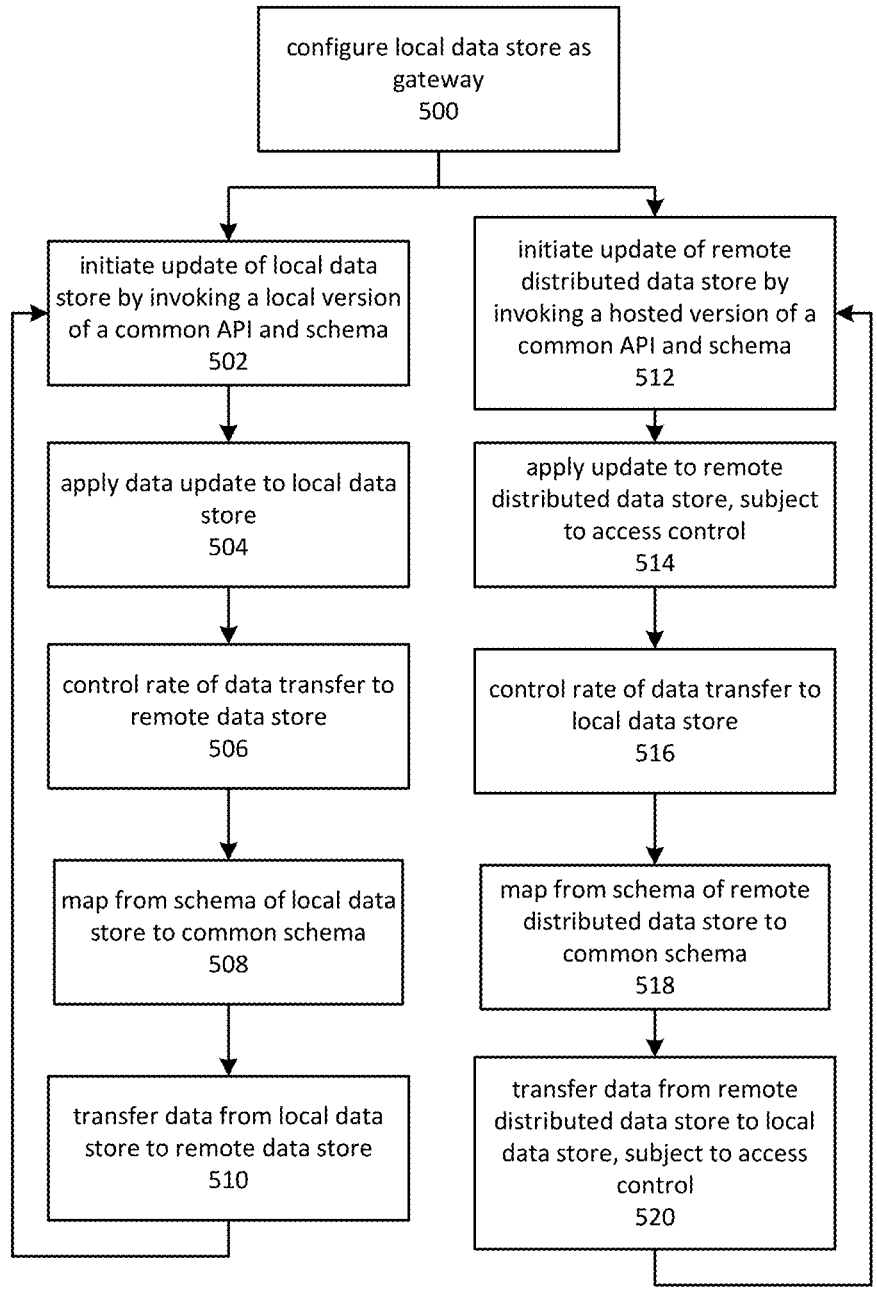
FIG. 5 is a flowchart depicting an embodiment of a process for operating a local data store as a data gateway.

FIG. 5 depicts an embodiment in which a local data store is configured as a data gateway. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 500 depicts configuring a local data store to act as a gateway for data to be transferred to a remote data store, from a remote data store, or both. Embodiments may act as a data gateway by transmitting data in the desired direction or directions continuously or at periodic intervals. Operations 502 through 510 depict aspects of updating a local data store and transferring the data to a remote data store. Operations 512 through 520 depict aspects of updating a remote data store and transferring the data to a local data store.

Operation 502 depicts initiating an update of a local data store by invoking a local version of a common API and schema. Embodiments may employ a common API to allow applications running locally or remotely to initiate updates using common API semantics. Common schema acts to improve transferability of data between data stores. In some embodiments, commonality of API and/or schema is not required.

At operation 504, the update may be applied to a local data store. Some embodiments may perform mapping from the common schema to the schema employed by the local data store. In other embodiments, the common schema and the schema employed by the local data store may be identical or sufficient. In some embodiments, the schema employed by the local data store may be a subset of the schema employed by the remote data store, or of a common schema not fully implemented by any single data store.

Embodiments may execute a command to update the local data store, where the command may reflect any schema mapping that has occurred. The command may also be based on a mapping from key-value semantics to relational semantics, if the local data store is a relational database.

Operation 506 depicts controlling the rate of data transfers from the local data store to the remote data store. Embodiments may employ a variety of factors to determine when to transfer data, or to determine how much data to transfer. The scheduling, frequency, and amount of data transfer may be based on factors such as a level of provisioned throughput, an amount of data in the local data store that has changed, a minimum interval, a maximum interval, a predefined frequency and so forth.

Embodiments may perform data coalescing and/or de-duplication of data prior to or contemporaneously with synchronization. This may, for example, involve eliminating redundant updates to the same item, so that the amount of data transmitted may be reduced. These operations may be performed by the local data store and/or the remote distributed data store.

Various filters may be applied to data on the local data store and/or the remote distributed data store. The filters may be employed to select or to restrict data to be synchronized or otherwise transferred. Examples of filters include queries that identify subsets of data in a table or other collection of items, data associated with a user, group, or role, recent data and so forth. In some cases and embodiments, filters for the remote distributed data store may be supplied by an administrator of the remote distributed data store, and are not overridden by user or customer-supplied filters. In other cases, users or customers may supply filters to be applied to the remote data store upon synchronization or other transfers of data.

When a transfer is initiated, data maintained in the local data store may mapped, as depicted by operation 508 from the schema of the local data store to the common schema. Some embodiments may map directly to the schema of the remote data store, if it differs from that of the common schema. Once mapped, the data may be transferred to the remote data store, as depicted by operation 510. In some embodiments, the data may be transferred as a series of commands that may be parsed and executed at the remote location using the common API. Other embodiments may encode or compress the data.

The amount of data transferred may be limited by a number of factors. Embodiments may, for example, send only the data that has been affected by a change made since the previous transmission. The volume of data may be limited to an amount that would not exceed provisioned throughput restrictions, or that is unlikely to cause provisioned throughput restrictions to be exceeded.

Operations 512 through 520 depicts aspects of updating a remote data store and transferring the updated data to one or more local data stores. This may be done instead of or in addition to operations 502 through 510. In one embodiment, a remote distributed data store transmits updates to a plurality of local data stores.

Applications running in a hosted environment may initiate an update of the data maintained in a remote distributed data store, as depicted by operation 512. This may be done through an application's use of a common API and schema. In some embodiments, an application that runs on a local computing device using a local data store may be made operative in a hosted environment without changing its use of the common API or schema. Similarly, an application that runs in a hosted environment against a remote distributed data store may be made to operate on a local computing device using a local data store.

Operation 514 depicts applying the update to a remote distributed data store. In some cases and embodiments, translation between the common schema and that of the remote distributed data store may be performed. In other cases, the common API schema and that of the remote distributed data store are the same. Embodiments may apply the update once any necessary translation is performed. Updates to the remote distributed data store may be subject to access control. Data transferred from the local data store may be supplied with a verified identity of a user, which may be based on the user validating his credentials via a public identity service. Information indicative of the verified identity of the user may be supplied with the data, and used to control access to subcollections in a collection of the remote distributed data store. These operations may be performed even if the remote distributed data store has not previously seen or validated the credentials of the user.

As depicted by operation 516, the rate or period for transmitting data to local data stores may be controlled, based on factors such as provisioned throughput restrictions and the amount of data that has changed subsequent to the previous transmission.

Operation 518 depicts mapping from the schema of the remote distributed data store to the common schema. In some embodiments, the schema of the remote distributed data store and the common schema will be the same, or the schema of the remote distributed data store will be a subset of the common schema. In such cases, the mapping operation may be omitted. Subsequent to mapping, the data may be transferred from the remote distributed data store to one or more local data stores, as depicted by operation 520. The data sent may be restricted based on a verified identity of the user and any applicable rights associated with the items to be transferred to the local store. For example, when an item is stored in a collection of the remote distributed data store, it may be associated with a verified user identity. At operation 520, some embodiments may restrict data transferred to those items that are associated with the user of the local data store.

Figure 6:
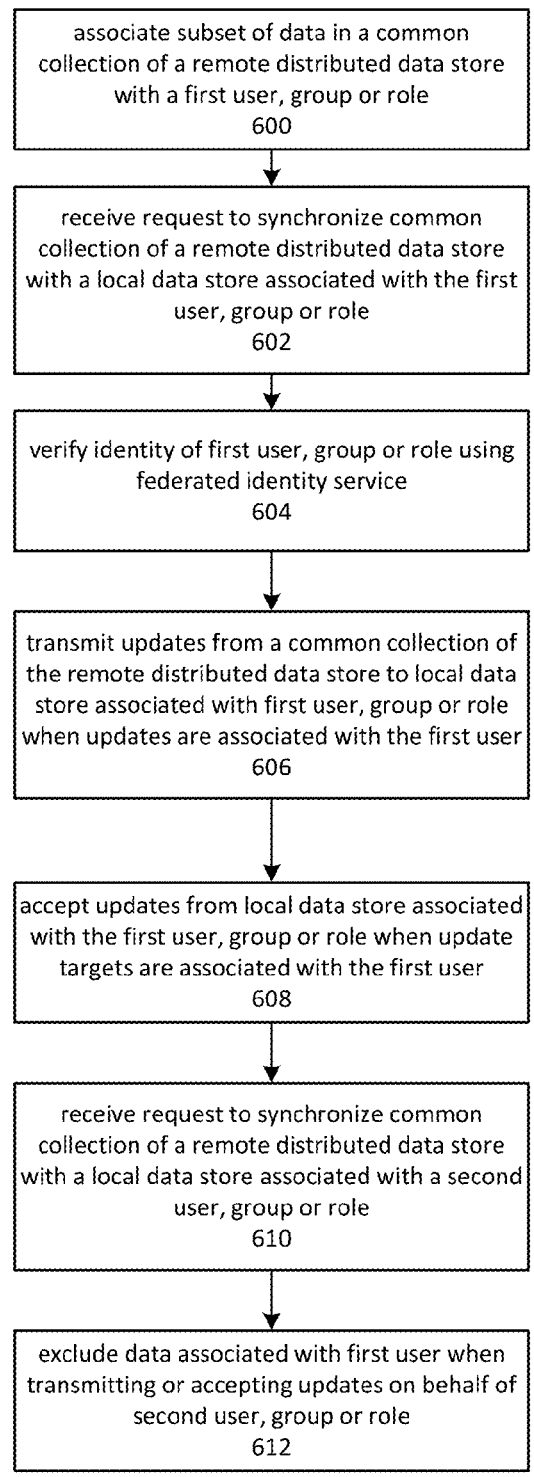
FIG. 6 is a flowchart depicting an embodiment of a process for applying fine-grained access control to items in a distributed data store during operations such as synchronization.

Data transfer operations may be restricted by applying fine-grained permissions to updates to a remote distributed data store. FIG. 6 depicts an embodiment for applying fine-grained permissions to data transfer operations between a local data store and a remote distributed data store. Although depicted as a sequence of operations, those of ordinary skill in the art will appreciate that the depicted order should not be construed as limiting the scope of the present disclosure and that at least some of the depicted operations may be altered, omitted, reordered or performed in parallel.

As depicted by operation 600, a subset of data in a remote distributed data store may be associated with a first user, group or role. The subset may be a subcollection of a common collection of data of the remote distributed data store. Other subsets of data in the common collection may be associated with other users, groups or roles. For example, a collection of data in the remote distributed data store might be employed to store information pertaining to multiple users, only a subset of which is accessible to the first user. The association may imply some level of control over or rights to access the data. The rights may be affirmative, such as the right to read or modify the data. The rights may also be negative, for example indicating that the first user, group or role is not permitted to write to the data.

Operation 602 depicts receiving a request to synchronize data between a local data store and a common collection of data maintained by a remote distributed data store, or otherwise transfer data into the remote distributed data store. The request may be received, for example, by a hosted application operating remotely and connected to the remote distributed data store. The request may originate from a local computing device under the control of the first user. The local computing device may contain a local data store in which one or more collections are to be synchronized with one or more collections in the remote distributed data store. The local collections to be synchronized may be placed within corresponding collections at the remote distributed data store. The corresponding collections at the remote distributed data store may be shared with other users.

In some embodiments, a single computing device may maintain multiple data stores each associated with a different user, or multiple users may share a single local data store. If so, a subset of data from a local collection might be synchronized with a remote distributed data store, rather than the entire local data store, or an entire collection in a remote data store. A verified identity of the current user may be submitted with the data to be synchronized, so that the correct user may be identified.

The received request may include identification information, such as credentials, associated with the first user, group or role. At operation 604, the credentials or other identifying information may be verified. Embodiments may employ a domain server or database associated with the same domain as the remote distributed data store. Other embodiments may employ outside federated identity services to verify the identity of the user in a manner that is compatible with single-sign on across multiple independent domains.

At operation 606, embodiments may transmit data from the remote distributed data store to the local data store associated with the first user, where the data is associated with the first user, group or role. For example, the first user might have read privileges for the data in question and therefore be permitted read access. Operation 606 may also be described as transmitting data from the subcollection of data associated with the first user, group or role.

At operation 608, the remote distributed data store may receive and process updates from the local data store associated with the first user, group or role. The updates may be applied to data in the remote distributed data store when the data corresponds to a subcollection associated with the user, group or role. The updates may also be applied if the user, group or role has been granted write privileges to the data.

Embodiments may receive a request to synchronize data from the common collection in the remote distributed data store with data in a local data store associated with a second user, group or role, as depicted by operation 610. During synchronization, embodiments may exclude data associated with the first user, group or role when transmitting data to the local data store or when accepting updates from the local data store, as depicted by operation 612.

Figure 7:
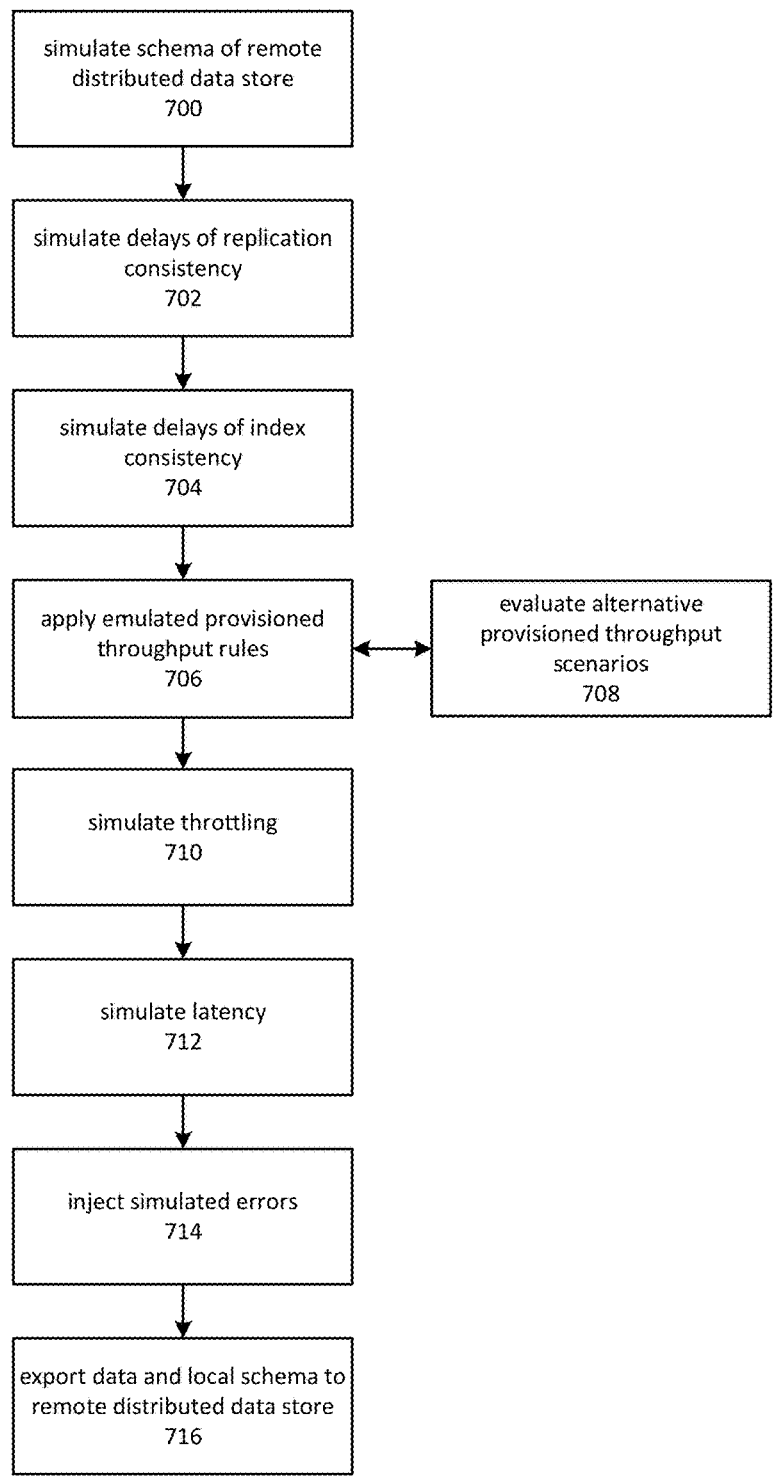
FIG. 7 is a flowchart depicting an embodiment of a process for simulating behaviors of a remote distributed data store on a local device with a local data store.

FIG. 7 depicts an embodiment of a process for simulating behaviors of a remote distributed data store on a local device. Although depicted as a sequence of operations, those of ordinary skill in the art will appreciate that the depicted order should not be construed as limiting the scope of the present disclosure and that at least some of the depicted operations may be altered, omitted, reordered or performed in parallel.

A local data store may possess a schema that is not identical to that of a remote distributed data store. This may be due to use of different storage paradigms, such as a local data store that uses a relational data store and a remote distributed data store that uses a key-value paradigm. It may also be a result of the use of different forms of normalization, data types, constraints, and so forth. Embodiments may simulate the schema of a remote distributed data store through various means, for example by utilizing views, joins, projections and so forth. Operation 700 depicts simulating the schema of a remote distributed data store.

Operation 702 depicts simulating replication delays. In various embodiments of a distributed data store, updates to one data store may not be immediately applied to all replicas of the data source. The update is said to be eventually consistent because, once the update has become durable, it is guaranteed to be eventually propagated to all of the replicas. An application that accesses eventually consistent data may encounter errors caused by this delay. The delay may be simulated to enable a test application to discover such errors while still operating locally. Similarly, operation 704 depicts simulating delays in applying updates to index structures. In a remote distributed database system, some indexes may not be updated immediately. Queries that rely on these indexes may therefore produce inconsistent results, which may also result in errors. Embodiments may also simulate this behavior.

Operation 706 depicts simulating provisioned throughput rules. Incoming or outgoing data for the local data store may be measured to determine a throughput rate. Embodiments may trigger throttling errors if the measured throughput exceeds the provisioned amount. The provisioned amount may be set to the same amount as a corresponding remote distributed data store. As depicted by operation 708, some embodiments may be employed to evaluate alternative provisioned throughput scenarios. For example, a local data store could measure throughput usage and recommend that the user purchase an amount of provisioned throughput that is optimal for the measured uses. Embodiments may also provide cost estimates based on the amount of usage. The estimates may be used as a measure of how much provisioned throughput should be purchased in order to operate on the remote distributed data store prior to deployment.

Various throttling effects may also be simulated, as depicted by operation 710. This may include throttling based on exceeding provisioned throughput, or other causes. Latency may also be simulated, as depicted by operation 712. Embodiments may emulate expected latency based on a variety of factors, including expected characteristics of a remote distributed data store corresponding to or associated with the local data store. For example, an application might be tested locally, with a local data store. Upon deployment, both the application and data store might be switched to a hosted environment, in which a remote distributed data store is employed rather than a single local data store. Characteristics of the remote distributed data store, such as the number of horizontal partitions, the number of replication partners and so forth may be used as a basis for emulating behaviors such as latency.

As depicted by operation 714, errors might also be simulated. Factors such as a load, randomness, and so forth may be utilized to determine how often and what type of errors should be generated. Injection of errors allows for improvement testing prior to deployment.

Embodiments may support deployment from local to a remote hosted computing environment, as depicted by operation 716. Deployment may comprise exporting data from the local data store to the remote distributed data store. In some embodiments, deployment may involve synchronizing changes to schema made on the local data store. For example, a schema could be developed and tested on the local data store and then deployed to the remote distributed data store. In some cases and embodiments, deployment may involve creating a new schema in the remote distributed data store, such that the new schema is similar or identical to schema on the local data store.

Embodiments may receive information about various characteristics of a distributed data store. The information may describe horizontal partitioning schemes, replication schemes, indexing schemes, information about the volume and distribution of data and so on. Embodiments may utilize the information to emulate distributed data store behaviors such as request latency.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices such as solid-state drives.

Figure 8:
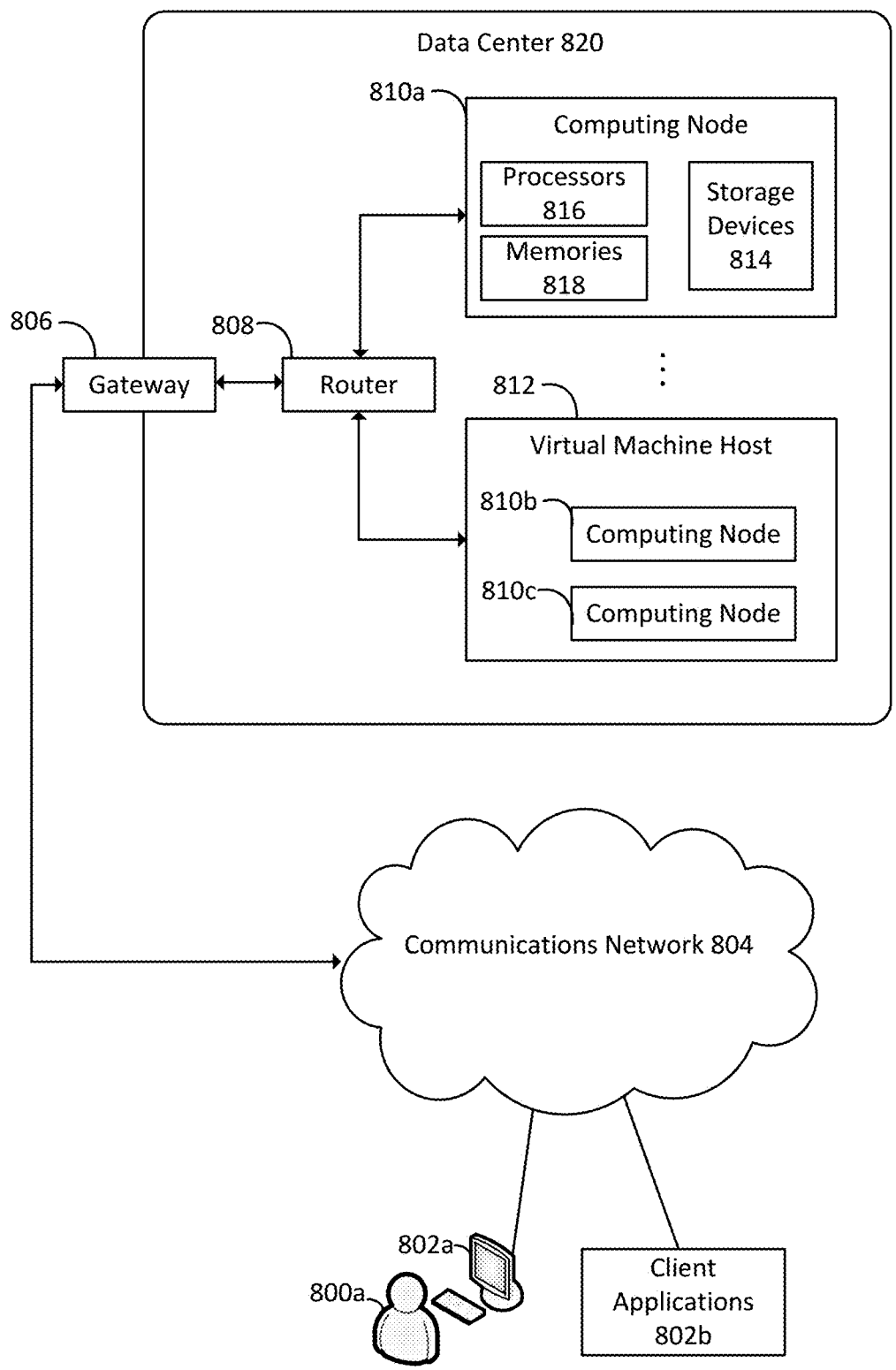
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800a may interact with various client applications, operating on any type of computing device 802a, to communicate over communications network 804 with processes executing on various computing nodes 810a, 810b and 810c within a data center 820. Alternatively, client applications 802b may communicate without user intervention. Communications network 804 may comprise any combination of communications technology, including the Internet, wired and wireless local area networks, fiber optic networks, satellite communications and so forth. Any number of networking protocols may be employed.

Communication with processes executing on the computing nodes 810a, 810b and 810c, operating within data center 820, may be provided via gateway 806 and router 808. Numerous other network configurations may also be employed. Although not explicitly depicted in FIG. 8, various authentication mechanisms, web service layers, business objects or other intermediate layers may be provided to mediate communication with the processes executing on computing nodes 810a, 810b and 810c. Some of these intermediate layers may themselves comprise processes executing on one or more of the computing nodes. Computing nodes 810a, 810b and 810c, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816, one or more memories 818 and one or more storage devices 814. Processes on computing node 810a may execute in conjunction with an operating system or alternatively may execute as a bare-metal process that directly interacts with physical resources such as processors 816, memories 818 or storage devices 814.

Computing nodes 810b and 810c are depicted as operating on virtual machine host 812, which may provide shared access to various physical resources such as physical processors, memory and storage devices. Any number of virtualization mechanisms might be employed to host the computing nodes.

The various computing nodes depicted in FIG. 8 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices such as cell phones, smartphones, tables, embedded device, and so on. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth.

Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
    a memory to store program instructions which, if performed by at least one processor, cause the at least one processor to perform a method to at least:
        receive, at an emulator, an invocation of an application programming interface (API) for a data storage service to access an item of a data set stored in a data store according to a first data schema from an application running on the at least one processor, wherein the API includes a reference to the item specified according to a second data schema for data stored in the storage service;
        responsive to the invocation of the API:
            translate, by the emulator, the reference to the item in the API to specify the item according to the first data schema;
            access, by the emulator, the item in the data set at the data store using the translated reference to the item instead of the reference to the item included in the API; and
            return, by the emulator, a result of the access to the application according to the API.

2. The system of claim 1, wherein the access to the item updates the item, and wherein the program instructions further cause the at least one processor to perform the method to send, by the emulator, an indication of the update to the data storage service to synchronize a copy of the item stored at the data storage service.

3. The system of claim 1, wherein the access to the item reads the item, and wherein the program instructions further cause the at least one processor to perform the method to:
    prior to the return of the result, modify the result to include a prior version of the item than a version of the item stored in the data store when the invocation of the API is received in order to simulate an eventually consistent replication model for a distributed data store.

4. The system of claim 1, wherein the program instructions further cause the at least one processor to perform the method to:
    receive, at the emulator, another invocation of the API to access another item of the data set stored in the data store from the application, wherein the API includes a reference to the other item specified according to the second data schema;
    responsive to the other invocation of the API:
        determine, by the emulator, that a throughput rate for access to the data set from the application exceeds a provisioned throughput; and
        in response to the determination that the throughput rate for the access to the data set from the application exceeds the provisioned throughput amount, return, by the emulator, a rejection response for the other invocation to the application according to the API.

5. The system of claim 1, wherein the program instructions further cause the at least one processor to perform the method to:
    prior to the return of the result, delay the return of the result in order to simulate a network latency between the application and the data storage service.

6. The system of claim 1, wherein the program instructions further cause the at least one processor to perform the method to:
    receive, at the emulator, another invocation of the API to access another item of the data set stored in the data store from the application, wherein the API includes a reference to the other item specified according to the second data schema;
    responsive to the other invocation of the API:
        determine, by the emulator, a data storage service error to inject into processing of the invocation of the API; and
        return, by the emulator, the determined error in a response for the other invocation to the application according to the API.

7. The system of claim 1, wherein the first data schema is a relational data schema, and wherein the second data schema is a key-value data schema.

8. A method, comprising:
    receiving, at an emulator, an invocation of an application programming interface (API) for a data storage service to access an item of a data set stored in a data store according to a first data schema from an application running on the at least one processor, wherein the API includes a reference to the item specified according to a second data schema for data stored in the storage service;
    responsive to the invocation of the API:

translating, by the emulator, the reference to the item in the API to specify the item according to the first data schema;

accessing, by the emulator, the item in the data set at the data store using the translated reference to the item instead of the reference to the item included in the API; and returning, by the emulator, a result of the access to the application according to the API.

9. The method of claim 8, wherein the access to the item updates the item, and wherein the method further comprises sending, by the emulator, an indication of the update to the data storage service to synchronize a copy of the item stored at the data storage service.

10. The method of claim 8, wherein the access to the item reads the item, and wherein the method comprises:

prior to returning the result, modifying the result to include a prior version of the item than a version of the item stored in the data store when the invocation of the API is received in order to simulate an eventually consistent replication model for a distributed data store.

11. The method of claim 8, further comprising:

receiving, at the emulator, another invocation of the API to access another item of the data set stored in the data store from the application, wherein the API includes a reference to the other item specified according to the second data schema;

responsive to the other invocation of the API:

determining, by the emulator, that a throughput rate for access to the data set from the application exceeds a provisioned throughput; and in response to determining that the throughput rate for the access to the data set from the application exceeds the provisioned throughput amount, returning, by the emulator, a rejection response for the other invocation to the application according to the API.

12. The method of claim 8, further comprising:

prior to the return of the result, delaying the return of the result in order to simulate a network latency between the application and the data storage service.

13. The method of claim 8, further comprising:

receiving, at the emulator, another invocation of the API to access another item of the data set stored in the data store from the application, wherein the API includes a reference to the other item specified according to the second data schema;

responsive to the other invocation of the API:

determining, by the emulator, a data storage service error to inject into processing of the invocation of the API; and returning, by the emulator, the determined error in a response for the other invocation to the application according to the API.

14. The method of claim 8, wherein the first data schema is a relational data schema, and wherein the second data schema is a key-value data schema.

15. A non-transitory, computer-readable storage medium, storing program instructions that when executed by one or more computing devices, causes the one or more computing devices to implement:

receiving, at an emulator, an invocation of an application programming interface (API) for a data storage service to access an item of a data set stored in a data store according to a first data schema from an application running on the at least one processor, wherein the API includes a reference to the item specified according to a second data schema for data stored in the storage service;

responsive to the invocation of the API:

translating, by the emulator, the reference to the item in the API to specify the item according to the first data schema;

accessing, by the emulator, the item in the data set at the data store using the translated reference to the item instead of the reference to the item included in the API; and returning, by the emulator, a result of the access to the application according to the API.

16. The non-transitory, computer-readable storage medium of claim 15, wherein the access to the item updates the item, and wherein the program instructions cause the one or more computing devices to further implement sending, by the emulator, an indication of the update to the data storage service to synchronize a copy of the item stored at the data storage service.

17. The non-transitory, computer-readable storage medium of claim 15, wherein the access to the item reads the item, and wherein the program instructions cause the one or more computing devices to further implement:

prior to returning the result, modifying the result to include a prior version of the item than a version of the item stored in the data store when the invocation of the API is received in order to simulate an eventually consistent replication model for a distributed data store.

18. The non-transitory, computer-readable storage medium of claim 15, wherein the program instructions cause the one or more computing devices to further implement:

receiving, at the emulator, another invocation of the API to access another item of the data set stored in the data store from the application, wherein the API includes a reference to the other item specified according to the second data schema;

responsive to the other invocation of the API:

determining, by the emulator, that a throughput rate for access to the data set from the application exceeds a provisioned throughput; and in response to determining that the throughput rate for the access to the data set from the application exceeds the provisioned throughput amount, returning, by the emulator, a rejection response for the other invocation to the application according to the API.

19. The non-transitory, computer-readable storage medium of claim 15, wherein the program instructions cause the one or more computing devices to further implement:

prior to the return of the result, delaying the return of the result in order to simulate a network latency between the application and the data storage service.

20. The non-transitory, computer-readable storage medium of claim 15, wherein the program instructions cause the one or more computing devices to further implement:

receiving, at the emulator, another invocation of the API to access another item of the data set stored in the data store from the application, wherein the API includes a reference to the other item specified according to the second data schema;

responsive to the other invocation of the API:

determining, by the emulator, a data storage service error to inject into processing of the invocation of the API; and returning, by the emulator, the determined error in a response for the other invocation to the application according to the API.

\* \* \* \* \*